(12) United States Patent
Testino

(10) Patent No.: US 8,988,849 B2
(45) Date of Patent: Mar. 24, 2015

(54) VARACTOR AND METHOD FOR PRODUCING A VARACTOR

(75) Inventor: Andrea Testino, Genoa (IT)

(73) Assignee: EPCOS AG, Munich (DE)

( * ) Notice: Subject to any disclaimer, the term of this patent is extended or adjusted under 35 U.S.C. 154(b) by 204 days.

(21) Appl. No.: 13/518,372

(22) PCT Filed: Dec. 21, 2010

(86) PCT No.: PCT/EP2010/070422
§ 371 (c)(1),
(2), (4) Date: Aug. 28, 2012

(87) PCT Pub. No.: WO2011/085931
PCT Pub. Date: Jul. 21, 2011

(65) Prior Publication Data
US 2013/0003253 A1 Jan. 3, 2013

(30) Foreign Application Priority Data

Dec. 21, 2009 (DE) .......................... 10 2009 059 873

(51) Int. Cl.
*H01G 7/00* (2006.01)
*H01G 7/04* (2006.01)
*H01G 7/06* (2006.01)

(52) U.S. Cl.
CPC ... *H01G 7/04* (2013.01); *H01G 7/06* (2013.01)
USPC ........... 361/281; 361/277; 361/278; 361/287; 361/290; 361/292

(58) Field of Classification Search
CPC ............. H01G 5/18; H01G 5/16; H01G 5/38; H01G 5/40; H01G 5/0136; H01G 7/00; H01G 7/06
USPC ........... 361/277, 278, 281.1, 281.3, 286, 287, 361/290–292

See application file for complete search history.

(56) References Cited

U.S. PATENT DOCUMENTS 3,323,084 A 5/1967 Glanc
3,670,211 A 6/1972 Kumada et al.
(Continued)

FOREIGN PATENT DOCUMENTS

CN 1165586 A 11/1997
CN 101252813 A 8/2008
(Continued)

OTHER PUBLICATIONS

Alexandru, H.V., et al., "BST solid solutions, temperature evolution of the ferroelectric transitions," Applied Surface Science, No. 253, Jul. 13, 2006, pp. 354-357.
(Continued)

*Primary Examiner* — Nguyen T Ha
(74) *Attorney, Agent, or Firm* — Slater & Matsil, L.L.P.

(57) ABSTRACT

A varactor includes a first PTC region, which comprises a ceramic material with a positive temperature coefficient with respect to the resistance. The varactor also includes a capacitor region that includes a first electrode, a second electrode, and a first dielectric layer arranged between the first electrode and the second electrode. The first PTC region and the capacitor region are connected thermally conductively to one another. The capacitance of the capacitor region can be changed by applying a bias to the first PTC region, the capacitor region or to the first PTC region and the capacitor region.

20 Claims, 5 Drawing Sheets

(56) References Cited

U.S. PATENT DOCUMENTS

| | | | |
|---|---|---|---|
| 5,638,252 | A | 6/1997 | Drab et al. |
| 5,854,117 | A | 12/1998 | Huisman et al. |
| 6,411,494 | B1 | 6/2002 | Watt |
| 6,433,992 | B2 | 8/2002 | Nakagawa et al. |
| 7,056,468 | B2 | 6/2006 | Chiu et al. |
| 7,151,506 | B2 * | 12/2006 | Knowles et al. ............ 343/909 |
| 7,974,070 | B2 | 7/2011 | Togashi |
| 8,767,373 | B2 * | 7/2014 | Furukawa et al. ........... 361/277 |
| 2006/0203420 | A1 | 9/2006 | Okuyama |
| 2007/0145647 | A1 | 6/2007 | Sengupta et al. |
| 2008/0009578 | A1 | 1/2008 | Khatua et al. |
| 2009/0073332 | A1 | 3/2009 | Irie |

FOREIGN PATENT DOCUMENTS

| | | |
|---|---|---|
| CN | 101516980 A | 8/2009 |
| DE | 926925 C | 4/1955 |
| DE | 19653792 A1 | 6/1998 |
| DE | 102004045009 A1 | 4/2006 |
| FR | 1426596 A | 1/1966 |
| GB | 710612 A | 6/1954 |
| JP | 423344 | 2/1942 |
| JP | 3-254970 A | 11/1991 |
| JP | 4-364014 A | 12/1992 |
| JP | 56826 U | 1/1993 |
| JP | 8213278 A | 8/1996 |
| JP | 10335115 A | 12/1998 |
| JP | 2000-201024 A | 7/2000 |
| JP | 2006313221 A | 11/2006 |
| WO | WO 02/084858 A1 | 10/2002 |
| WO | WO 2006/041336 A1 | 4/2006 |
| WO | 2006068056 A1 | 6/2006 |
| WO | WO 2009/136320 A1 | 11/2009 |

OTHER PUBLICATIONS

Bao, P., et al., "Barium strontium titante thin film varactors for room-temperature microwave device applications," Journal of Physics D: Applied Physics, No. 41, Feb. 29, 2008, 21 pages.

Chou, X., et al., "Relaxor Behavior and Dielectric Properties of $MgTiO_3$-Doped $BaZr_{0.35}Ti_{0.65}O_3$ Composite Ceramics for Tunable Applications," Journal of the American Ceramic Society, vol. 90, No. 9, Sep. 2007, pp. 2799-2801.

Chung, U.-C., et al., "Low-losses, highly tunable $Ba_{0.6}Sr_{0.4}TiO_3$/MgO composite," Applied Physics Letters, vol. 92, No. 4, Jan. 2008, pp. 042902-1-042902-3.

Huber, C., et al., "Nano-ferroelectric based core-shell particles: towards tuning of dielectric properties," Cermics International, vol. 30, No. 7, 2004, pp. 1241-1245.

Liang, R-H., et al., "Improvement of Microwave Loss Tangent and Tunability of $Ba_{0.55}Sr_{0.45}TiO_3$/MgO Composites Using the Heterogeneous Precipitation Method," Journal of the American Ceramic Society, vol. 89, No. 10, 2006, pp. 3273-3276.

McSweeney, R., et al., "Square Loop $Ba(Ti,Zr)O_3$ Capacitors Based on Alkoxide Derived $(Ti,Zr)O_2$ Powders," Ceramic Powder Science II, Ceramic Transactions, vol. 1, 1988, pp. 1156-1166.

Moulson, A.J., et al., "Modified barium titanate dielectrics," Electroceramics, High-permittivity Ceramics, 2003, pp. 311-320, Wiley.

Ota, T., et al., "Dielectric Properties of $BaTiO_3$-Based Ceramics with Gradient Compositions," Dielectric Ceramic Materials: Ceramic Transactions, vol. 100, 2007, pp. 51-60.

Qin, B., et al., "Dielectric Properties of $(Ba, Sr, Ca)TiO_3$ Ceramics for Tunable Microwave Devices," IEEE Int'l Symposium on the Applications of Ferroelectrics, Jul. 30-Aug. 3, 2006, Shanghai University, Shanghai, pp. 368-371.

Tagantsev, A.K., et al., "Ferroelectric Materials for Microwave Tunable Applications," Journal of Electroceramics, vol. 11, 2003, 63 pages.

Testino, A., "High Performance Varactor," Advances in Science and Technology, vol. 67, 2010, pp. 16-21.

Tian, H.Y., et al., "Core-shell structure of nanoscaled $Ba_{0.5}Sr_{0.5}TiO_3$ self-wrapped by MgO derived from a direct solution synthesis at room temperature," Nanotechnology, vol. 16, No. 1, 2005, pp. 47-52.

Tsurumi, T., et al., "Size Effect of Barium Titanate and Computer-Aided Design of Multilayered Ceramic Capacitors," IEEE Transactions on Ultrasonics, Ferroelectrics, and Frequency Control, vol. 56, No. 8, Aug. 2008, pp. 1513-1522.

Vendik, O.G., et al., "Microwave losses in incipient ferroelectrics as functions of the temperature and the biasing field," Journal of Applied Physics, vol. 84, No. 2, Jul. 15, 1998, pp. 993-998.

Xue, H., et al., "The Structure and Dielectric Tunable Properties of Fine-Grained $Ba_{0.6}Sr_{0.4}TiO_3$ Ceramics Prepared by Spark Plasma Sintering," Journal of American Ceramic Society, vol. 90, No. 8, 2007, pp. 2653-2656.

Tai, C., et al., "Ferroelectric Domain Morphology Evolution and Octahedral Tilting in Lead-Free (Bi1/2Na1/2)TiO3-(Bi1/2K1/2)TiO3-(Bi1/2Li1/2)TiO3-BaTiO3 Ceramics at Different Temperatures," Journal of the American Ceramic Society, vol. 91, No. 10, 2008, pp. 3335-3341.

Wang, Y.L., et al., "Large Strain Lead-free Ceramic Materials for Actuators," 18th IEEE International Symposium on the Applications of Ferroelectrics, Aug. 23-27, 2009, pp. 1-4.

Yuan, Y., et al., "Dielectric and piezoelectric properties of (0.97-x) Bi1/2Na1/2TiO3-xBi1/2K1/2TiO3-0.03NaNbO3 Ceramics," Journal of Material Science, vol. 41, 2006, pp. 3561-3567.

Zhang, S.-T., et al., "Giant strain in lead-free piezoceramics Bi0.5Na0.5TiO3-BaTiO3-K0.5Na0.5NbO3 system," Applied Physics Letters, vol. 91, 2007, 3 pages.

* cited by examiner

VARACTOR AND METHOD FOR PRODUCING A VARACTOR

This patent application is a national phase filing under section 371 of co-pending International Application No. PCT/EP2010/070422, filed Dec. 21, 2010, which designated the United States and was not published in English, and which claims priority to German Application No. 10 2009 059 873.1, filed Dec. 21, 2009, both of which applications are incorporated herein by reference.

TECHNICAL FIELD

The present invention relates to a varactor and a method for producing a varactor.

BACKGROUND

A widespread problem of varactors is that of obtaining a good tunability with regard to the dielectricity.

Varactors are voltage-tunable capacitors in which the capacitance is dependent on a voltage applied thereto, or the capacitance can be altered by a change in the applied voltage. Varactors are employed for example in radiofrequency circuits in which electrical tuning takes place, such as, for example, in filters or phase shifters. Varactors can be used as frequency filters, for example, for radio and radio frequencies which can be electrically tuned. Semiconductor diode varactors have only a low quality factor, a low loading capacity and a limited capacitance range. By contrast, a ferroelectric varactor, in which the capacitance is tuned for example by varying the dielectric constant of a ferroelectric material by means of changing the bias voltage, has a high quality factor, a high loading capacity and at the same time a large capacitance range.

SUMMARY OF THE INVENTION

Embodiments of the invention provide a varactor in which the capacitance of the capacitor region can be altered in different ways.

One embodiment of the invention relates to a varactor comprising the following component parts:
  a first PTC region, which comprises a ceramic material having a positive temperature coefficient with respect to the resistance, and
  a capacitor region comprising:
    a first electrode,
    a second electrode,
    a first dielectric layer, which is arranged between the first electrode and the second electrode,
  wherein the first PTC region and the capacitor region are thermally conductively connected to one another, and the capacitance of the capacitor region can be altered by the application of a bias voltage to:
    the first PTC region,
    the capacitor region,
    the first PTC region and the capacitor region.

In such a varactor according to the invention it is possible to alter the capacitance of the capacitor region in different ways. In this case, as also in the case of the conventional varactors, the bias voltage can be applied to the capacitor region. In embodiments of the invention it is additionally possible to alter the capacitance of the capacitor region also by the application of a bias voltage to the PTC region. Furthermore, there is the possibility of also changing the capacitance of the capacitor by simultaneous application of a respective independent voltage both to the PTC region and to the capacitor region. Consequently, this results in three possibilities of varying the capacitance of the capacitor region.

By applying a bias voltage to the PTC region, it is possible to control the temperature of said region. By virtue of the fact that the PTC region is thermally conductively connected to the capacitor region and thus also thermally conductively connected to the first dielectric layer, the heat generated in the PTC region by the bias voltage is transferred into the first dielectric layer. As a result of the change in the temperature of the first dielectric layer, the dielectric constant of the first dielectric layer can change, for example, which results in an alteration of the capacitance of the capacitor region.

In one embodiment of the invention, the first PTC region is adjustable by application of a voltage to a temperature at which the first dielectric layer has a maximum tunability with regard to the dielectricity.

In this case, tunability n should be understood to be the difference in the dielectric constant $\epsilon$ between the minimum bias voltage ($\epsilon_{U_{min}}$), for example 0 V, and the maximum bias voltage ($\epsilon_{U_{max}}$). Therefore, the greater the extent to which the dielectric constant $\epsilon$ of the first dielectric layer can be influenced by the application of a bias voltage, the greater the tunability with regard to the dielectricity. In this case, it is desirable to obtain a greatest possible tunability. By virtue of the fact that, in the case of a varactor according to the invention, there are two separate possibilities of altering the capacitance of the capacitor region, which possibilities can be combined to form a third possibility, the varactor can be tuned over a very wide range.

In a further embodiment of the invention, the first PTC region is adjustable by application of a voltage to a temperature at which the dielectric loss of the capacitor region is adjustable.

A further aim alongside the maximum tunability is that of also being able to adjust the dielectric loss $\delta$ of the capacitor region. In this case, the dielectric loss $\delta$ is intended to be adjusted to a smallest possible value.

In a further embodiment of the invention, the first PTC region is adjustable by application of a voltage to a temperature at which the varactor has a highest possible quality factor.

The quality factor K, also called Q-factor, is a measure of specific properties of an oscillating system, such as a resonant circuit, for example. The quality factor describes, inter alia, the ratio of the tunability to the dielectric loss: $K=(1-n)^2/[n \cdot \tan \delta_{(U_{max})} \cdot \tan \delta_{(U_{min})}]$, where n is given by: $n=\epsilon_{U_{min}}/\epsilon_{U_{max}}$.

In a further embodiment of the invention, the first PTC region is arranged on the first electrode.

In connection with this invention, "arranged on" should be understood to mean that still further layers/regions can also be situated between the two layers/regions. In this case, the heat generated in the first PTC region by the application of a bias voltage can be transferred to the first dielectric layer via the first electrode, which is produced for example from a material having a very high thermal conductivity. For this purpose, the first electrode can comprise a metal, for example.

In one embodiment of the invention, the first PTC region consists of a ceramic material having a positive temperature coefficient with respect to the resistance, i.e., the entire first PTC region is formed by the ceramic material.

In a further embodiment of the invention, the first PTC region comprises a dopant.

The dopant can be, for example, Pb, Ca, Sn, Zr, Sr, Bi, Hf or a combination of these ions. As a result of the doping of the PTC region with these elements, the temperature range which can be achieved by the application of the bias voltage can be varied. Consequently, by way of example, the temperature range can be increased by the doping, as a result of which more heat can be generated, which can be transferred to the capacitor region or the first dielectric layer.

The dopants can also be, for example, Si, Al, B, Cu, Zn and combinations of these elements. By way of example, the sintering behavior, such as the shrinkage behavior or the coefficient of thermal expansion, can be influenced by a doping with these elements. In this case, the sintering behavior of the first PTC region is advantageously coordinated with the sintering behavior of the capacitor region.

The first PTC region can furthermore also be doped with transition metals/transition metal oxides or rare earth metals/rare earth metal oxides and combinations thereof.

In a further embodiment of the invention, the varactor additionally comprises a first intermediate layer, which is arranged between the first PTC region and the first electrode and which is largely impermeable to the dopants.

Preferably, the first intermediate layer is completely impermeable to the dopants. By virtue of the fact that the intermediate layer is largely or completely impermeable to the dopants of the first PTC region, the first intermediate layer ensures that both during the sintering process, and during the operation of the varactor, no dopants can pass from the first PTC region into the capacitor region. Consequently, the functionality of the capacitor region is not disturbed by the dopants of the first PTC region. In this case, the first intermediate layer can comprise, for example, elements from group 2A. Said elements can be present, for example, as oxides. The first intermediate layer can be doped with transition metals. The transition metals can likewise be present as oxides. The element from group 2A and the transition metal preferably form a compound having acceptor properties.

In a further embodiment of the invention, the varactor additionally comprises a second dielectric layer, which is arranged between the first intermediate layer and the first electrode.

By virtue of the second dielectric layer, a greater spatial separation between the capacitor region and the first intermediate layer takes place. This makes it possible to ensure, inter alia, that the PTC region and the intermediate layer do not have any disturbing influences on the capacitor region. Preferably, the second dielectric layer has a good thermal conductivity. By way of example, the same material as that used for the first dielectric layer can be used for the second dielectric layer. Preferably, the second dielectric layer has a similar sintering behavior to the first dielectric layer.

In a further embodiment of the invention, the varactor additionally comprises a second PTC region, which is thermally conductively connected to the capacitor region.

The advantages explained above and also below for the first PTC region, for example with regard to the material or else with regard to the spatial arrangement, correspondingly analogously also apply to the second PTC region.

In a further embodiment of the invention, the varactor additionally comprises a second intermediate layer, which is arranged between the second PTC region and the second electrode. Said second intermediate layer is correspondingly largely impermeable to the dopants of the second PTC region.

In a further embodiment of the invention, the varactor additionally comprises a third dielectric layer, which is arranged between the second intermediate layer and the second electrode.

Advantageous configurations such as have been mentioned in connection with the second dielectric layer correspondingly apply to the third dielectric layer.

In a further embodiment of the invention, the first PTC region, the second PTC region and the capacitor region form a layer stack, and the first PTC region and the second PTC region are arranged at two opposite sides of the capacitor region. The layer stack advantageously comprises ceramic films laid one above another, wherein the topmost and also the bottommost films are component parts of the first and second capacitor regions.

It is thereby possible to supply the capacitor regions with heat from two opposite sides. Consequently, the capacitor region can be heated more uniformly.

In a further embodiment of the invention, the first PTC region has an electrical contact-connection.

In this case, the electrical contact-connection should not be understood to mean the first electrode of the capacitor region. Via the electrical contact-connection, for example an external electrode, voltage can be applied to the first PTC region, without voltage being applied to the capacitor region. As a result, the first PTC region can be supplied with voltage independently of the capacitor region.

In a further embodiment, the second PTC region has an electrical contact-connection.

With respect to the latter, explanations corresponding to those given above in connection with the first PTC region and the contact-connection thereof are applicable, but this contact-connection can be shaped separately from the contact-connection of the first PTC region.

In a further embodiment, the first dielectric layer has an additionally electrical contact-connection alongside the first and the second electrode.

This can be an external electrode, for example. Via the latter, voltage can be applied to the first dielectric layer, which is independent of the operating voltage of the capacitor region. By way of example, the dielectricity of the first dielectric layer can be tuned by the application of the voltage via this electrical contact-connection.

In a further embodiment of the invention, the first PTC region comprises $Ba_{1-x}Sr_xTi_{1-y}Zr_yO_3$, wherein the following holds true: $0<x<1$; $0\leq y<1$.

In a manner corresponding to the previous explanations, the first PTC region can additionally comprise dopants.

In a further embodiment, the second PTC region comprises $Ba_{1-x}Sr_xTi_{1-y}Zr_yO_3$, where the following holds true: $0<x<1$; $0\leq y<1$.

Explanations corresponding to those given above with respect to the first PTC region are applicable to the dopants of the second PTC region.

In a further embodiment, the first dielectric layer comprises $Ba_{1-x}Sr_xTi_{1-y}Zr_yO_3$, wherein the following holds true: $0<x<1$; $0\leq y<1$.

Barium titanate or the corresponding doped variants thereof can be ferroelectrics. The term ferroelectrics denotes a class of materials which have a polarization even without an external applied field. The property of ferroelectricity disappears above a characteristic temperature, the Curie temperature. This transition is referred to as a phase transition. Above this temperature, the polarization disappears and the substance is then referred to as paraelectrics. In the ferroelectric state, the centers of positive and negative charge, for example the anions and cations, are shifted relative to one another. In the case of barium titanate, by way of example, the $Ti^{4+}$ is shifted relative to the oxygen ions $O^{2-}$. Above 120° C., the ferroelectricity of barium titanate disappears and the latter behaves like a paraelectric dielectric.

In the case of barium strontium titanate (BST), a phase transition takes place from the tetragonal, ferroelectric phase to the cubic, paraelectric phase in the region of the Curie temperature $T_c$. In this case, the exact Curie temperature $T_c$ is dependent on the exact composition, that is to say the doping, of the barium strontium titanate.

In a further embodiment of the invention, the first dielectric layer comprises one of the following ions or combinations thereof: Pb, Ca, Sn, Zr, Sr, Bi, Hf.

The doping of the first dielectric layer makes it possible to shift the Curie temperature $T_c$ at which the phase transition occurs. The Curie temperature $T_c$ can thereby be shifted into a temperature range which is attained in the first dielectric layer by the supply of heat from the PTC region. Consequently, by means of application of the bias voltage to the PTC region and the resultant heat that is transferred to the first electric layer, a phase transformation can be brought about in the latter. The ferroelectric or paraelectric properties such as, for example, the dielectric constant $\epsilon$ of the first dielectric layer can be altered by means of the phase transformation.

In a further embodiment of the invention, the first dielectric layer comprises one of the following dopants or combinations thereof: Ni, Al, Mg, Fe, Cr, Mn.

The doping of the first dielectric layer with these dopants makes it possible to reduce the dielectric loss of the capacitor region.

In a further embodiment of the invention, the first dielectric layer comprises one of the following dopants or combinations thereof: Si, Al, B, Cu, Zn.

The sintering behavior, such as, for example, the shrinkage behavior or the coefficient of thermal expansion, of the first dielectric layer can be influenced by a doping of the first dielectric layer with these dopants. Preferably, all dielectric layers of the varactor have a comparable sintering behavior.

The first dielectric layer can also consist of a mixture of different ceramic phases, namely for example of a perovskite phase and a further dielectric ceramic having a lower dielectric constant, such as, for example, zirconates, silicates, titanates, aluminates, stannates, niobates, tantalates or rare earth metal oxides. Furthermore, the first dielectric layer can comprise elements from groups 1A and 2A. The first dielectric layer can also comprise the following elements or the oxides thereof: Ti, V, Cr, Mn, Zr, Nb, Mo, Hf, Ta and W. The first dielectric layer can comprise elements or oxides of the rare earth metals, such as, for example, Sc, Y, La, Ce, Pr and Nd, and mixtures thereof.

Explanations given in connection with the first dielectric layer with regard to the sintering behavior analogously also apply to further dielectric layers of the varactor.

In a further embodiment, the second and/or third dielectric layer comprise(s) $Ba_{1-x}Sr_xTi_{1-y}Zr_yO_3$, where the following holds true: $0<x<1$; $0\leq y<1$.

Explanations given above with regard to the doping in connection with the first dielectric layer analogously also apply to the second and/or third dielectric layer.

In a further embodiment of the invention, the varactor has a symmetrical construction with respect to the first dielectric layer.

This means, in particular, that all layers which follow the first electrode also follow the second electrode in the corresponding sequence. Preferably, the corresponding layers in each case have a corresponding identical layer thickness, and also the same external dimensions. Preferably, the corresponding layers each have the same composition. Consequently, with respect to the plane of symmetry running through the first dielectric layer, all layers situated on one side of the first dielectric layer can also be transferred to those onto the other opposite side. The advantages discussed with regard to the first side correspondingly also apply to the opposite side.

The symmetrical construction of the varactor makes it possible to ensure that the first dielectric layer is heated from both sides identically, that is to say with an identical intensity and with an identical heat distribution over the adjacent areas. Consequently, a temperature gradient in the first dielectric layer from one electrode to the other is avoided, and the tuning effect that occurs as a result of the heating of the first dielectric layer thus also occurs symmetrically in the latter.

In a further embodiment of the invention, the varactor is shaped as a surface-mountable device (SMD).

In a further embodiment of the invention, the varactor is thermally insulated from the surroundings. This can be effected for example by means of a material having a low thermal conductivity. The varactor can be enveloped by said material, for example. This ensures that the heat generated by the application of the bias voltage in the first PTC region is passed on predominantly to the capacitor region, and only a small proportion of said heat is passed on to the surroundings.

In one embodiment, the layer thickness of the first dielectric layer arranged between the first electrode and the second electrode is 14.5 μm.

In one embodiment, the first electrode and the second electrode are each composed of Pd.

Alongside the varactor, a method for producing the varactor is also disclosed.

In one variant of the method for producing a varactor described above, the method comprises the following method steps:

A) shaping a layer stack comprising at least the following layers:
first PTC region,
first electrode,
first dielectric layer,
second electrode, B) sintering the layer stack from A), such that a varactor is formed, in which the capacitance of the capacitor region can be altered by the application of a bias voltage to the first PTC region, the capacitor region or the first PTC region and the capacitor region.

By way of example, a varactor as described above can be produced by means of such a method. Those materials such as have been explained above in connection with the varactor can be used for the corresponding layers/regions.

In a further variant of the method, in method step A), a first PTC region comprising dopants is produced, and a first intermediate layer is shaped, which is arranged between the first PTC region and the first electrode, and is largely impermeable to the dopants.

Preferably, the first intermediate layer is completely impermeable to ions. By forming such an intermediate layer in method step A), it is possible, both in the subsequent method step B), the sintering, and during the operation of the varactor, to prevent migration of dopants for example from the first PTC region into the first dielectric layer. This prevents dopants for example from passing into the capacitor region and impairing the functionality of the capacitor region there.

The layer stack in method step A) can additionally comprise, alongside the layers already mentioned, any further layer described above in connection with the varactor.

A sintering aid, such as, for example, a glass phase, can be admixed with the ceramic layers in order to reduce the sintering temperature. As a result, it is possible to form a complex ceramic system which can already be sintered at low temperatures, and can also be sintered jointly with, for example, electrodes having a low melting point. Such a ceramic system is also referred to as LTCC (low temperature co-fired ceramic).

In one variant of the method, the sintering temperature is in a range of 800° C. to 1600° C.

In a further variant of the method, in an additional method step, an electrical contact-connection is applied to the first PTC region.

In a further variant of the method, the layer stack in method step A) additionally comprises a second PTC region.

In a further variant of the method, in an additional method step, an electrical contact-connection is applied to the second PTC region.

The electrical contact-connection can be applied, for example, by means of sputtering or screen printing or some other deposition technique.

By way of example, Pd can be used for the first electrode and the second electrode.

In another variant of a production method, the individual layers/regions are sintered before they are joined together to form a layer stack. The joining together can be effected by means of an adhesive, for example. The adhesive can comprise an epoxide, for example.

BRIEF DESCRIPTION OF THE DRAWINGS

Variants of the invention will be explained in greater detail below with reference to figures and exemplary embodiments.

Figure 1:
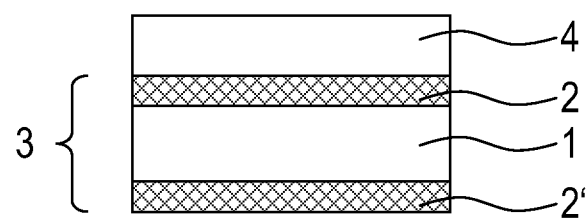
FIG. 1 shows a schematic cross section through a first embodiment of a varactor according to the invention.

The following list of reference symbols may be used in conjunction with the drawings:

1 First dielectric layer
2 First electrode
2' Second electrode
3 Capacitor region
4 First PTC region
5 Second dielectric layer
6 First intermediate layer
7 Third dielectric layer
8 Second intermediate layer
9 Second PTC region
10 Electrical contact-connection of the first PTC region
10' Electrical contact-connection of the second PTC region
11 Electrical contact-connection of the first dielectric layer

DETAILED DESCRIPTION OF ILLUSTRATIVE EMBODIMENTS

FIG. 1 shows an exemplary embodiment of a varactor according to the invention in schematic cross section. This exemplary embodiment comprises a capacitor region 3, which comprises a first dielectric layer 1, on the top side of which a first electrode 2 is arranged and on the underside of which a second electrode 2' is arranged. A first PTC region 4 is arranged on the first electrode 2. As a result of the application of a bias voltage to the first PTC region 4, heat is generated in the latter, said heat being forwarded to the first dielectric layer 1 via the first electrode 2. As a result of the supply of heat into the first dielectric layer 1, the capacitance of the capacitor region 3 can be altered.

Figure 2:
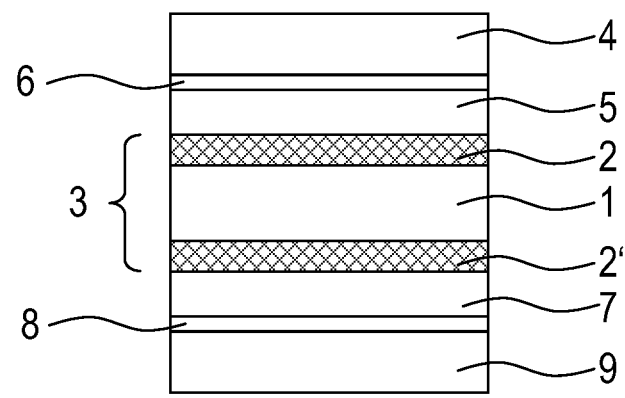
FIG. 2 shows a schematic cross section through an embodiment of a varactor according to the invention which has a symmetrical construction with respect to the first dielectric layer.

FIG. 2 shows, in schematic cross section, a further exemplary embodiment of a varactor, which exemplary embodiment has a symmetrical construction with respect to the first dielectric layer 1. In this case, the varactor comprises the following layers/regions: a second PTC region 9, a second intermediate layer 8, a third dielectric layer 7, a second electrode 2', a first dielectric layer 1, a first electrode 2, a second dielectric layer 5, a first intermediate layer 6 and a first PTC region 4. In this case, the first dielectric layer 1, the first electrode 2 and the second electrode 2' form the capacitor region 3. A bias voltage can now in each case be applied to the first PTC region 4 and a second PTC region 9, as a result of which heat is respectively emitted from these two PTC regions in the direction of the first dielectric layer 1. The first intermediate layer 6 and the second intermediate layer 8 respectively prevent in each case dopants from migrating from the adjoining PTC regions in the direction of the second dielectric layer 5 and the third dielectric layer 7, respectively. This ensures that no dopants pass into the capacitor region 3 and the functionality of the capacitor region 3 is reduced. The symmetrical construction of the varactor with respect to the first dielectric layer 1 ensures that the first dielectric layer 1 can be heated to the same extent both from the top side and from the underside.

A first concrete exemplary embodiment will now be described in greater detail below. This exemplary embodiment has the construction as illustrated schematically in FIG. 2. In this case, the first PTC region 4 and the second PTC region 9 are each formed by 25 layers composed of $Ba_{0.75}Sr_{0.25}TiO_3$ (BST). In this case, the BST is doped with 0.3 at % Nb and 0.05 at % Mn. The first intermediate layer 6 and the second intermediate layer 8 are each formed by one layer of MgO doped with 1% by weight of $TiO_2$, as a result of which a magnesium titanate (MT) is present. The second dielectric layer 5 and the third dielectric layer 7 are each formed by 23 plies of $Ba_{0.75}Sr_{0.25}TiO_3$. The capacitor region 3 comprises two layers of $Ba_{0.75}Sr_{0.25}TiO_3$, in which the top side of the first layer and the underside of the second layer are respectively provided with Pd electrodes forming the first electrode 2 and the second electrode 2', respectively. The undoped layers of BST in this case have a layer thickness of 20 µm, and the doped BST layers have a layer thickness of 35 µm. The intermediate layers each have a layer thickness of 200 µm. The individual layers/regions each have a basic area of 10×10 cm.

Such a varactor can be obtained, for example, by sintering the corresponding green parts for 2 hours at 1350° C.

The first intermediate layer and the second intermediate layer, each consisting of MgO doped with 1% by weight of $TiO_2$ (MT), have a plurality of advantageous functions. Firstly, the intermediate layers make it possible that the doped layers/regions and the non-doped dielectric layers can be sintered jointly. In a comparative experiment without the intermediate layers it was possible to establish that the dopants migrated from the PTC regions into the dielectric layers during the sintering process. As a result, the dielectric layers became electrically conductive, which significantly impaired the functionality of the varactor.

In this exemplary embodiment, the MT layers function both as a physical diffusion barrier and as a chemical barrier, since $Mg^{2+}$ acts as an acceptor. As an acceptor, $Mg^{2+}$ can compensate for the donor effect of the dopants of the BST. A further positive effect recognized by the inventors is that during the sintering process $Mg^{2+}$ ions migrate into the dielectric layers, and likewise have an acceptor effect there. This acceptor effect reduces the dielectric loss of the capacitor region. As a third positive effect, the inventors established that the presence of $Mg^{2+}$ during the sintering process is reduced the number of oxygen vacancies. As a result, the grain size growth is restricted, such that the grain size does not exceed the desired extent.

Comparative measurements without the intermediate layers comprising $Mg^{2+}$ showed that in this case the grain size grows beyond a value of 100 μm, as a result of which the dielectric constant $\epsilon$ is reduced and the dielectric loss $\delta$ is increased.

Figure 3:
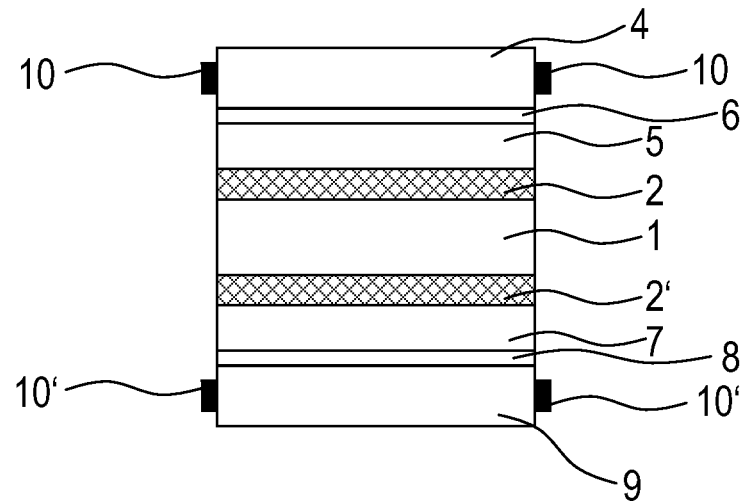
FIG. 3 shows a schematic cross section through an embodiment of a varactor according to the invention which has electrical contact-connections in each case at the two PTC regions.

FIG. 3 shows, in schematic cross section, a further exemplary embodiment of a varactor, which exemplary embodiment corresponds that from FIG. 2 and additionally has electrical contact-connections 10/10' on the first PTC region 4 and the second PTC region 9. The electrical contact-connections 10 and 10' are shaped as external electrodes. A voltage can be applied to the first PTC region 4 via the electrical contact-connections 10, and a voltage independent thereof can be applied to the second PTC region 9 via the electrical contact-connections 10'.

Figure 4:
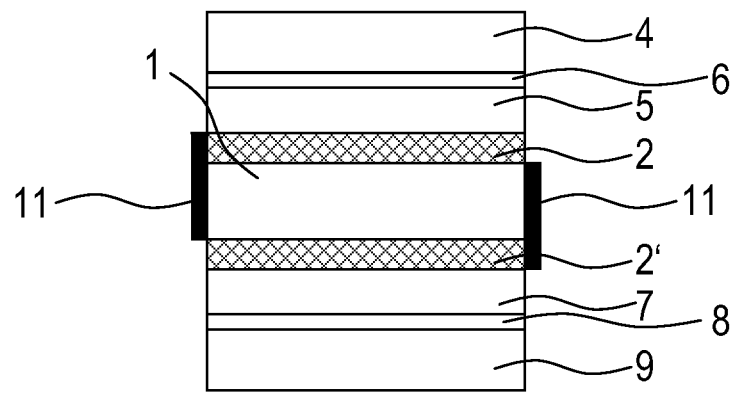
FIG. 4 shows a schematic cross section through an embodiment of a varactor according to the invention which has additional electrical contact-connections at the first dielectric layer.

FIG. 4 shows, in schematic cross section, a further exemplary embodiment of a varactor, which exemplary embodiment corresponds that from FIG. 2 and additionally comprises electrical contact-connections 11. The latter are arranged on the first dielectric layer 1, the first electrode 2 and the second electrode 2'. In this case, the electrical contact-connections 11 are electrically conductively connected to these three layers. Consequently, via the electrical contact-connections 11, a voltage can be applied directly to the first dielectric layer 1, and indirectly via the first electrode 2 and the second electrode 2'. Via the electrical contact-connections 11, it is possible to apply firstly the voltage with which the varactor is operated, and this can be AC voltage, for example, and also the bias voltage with which the first dielectric layer 1 can be tuned, and this can be DC voltage, for example.

At the side areas, the first electrode 2 and the second electrode 2' in each case extend toward the outside and can thus be contact-connected via the outer areas. At the front and rear sides, the first electrode 2 and the second electrode 2' in one exemplary embodiment are electrically insulated toward the outside by means of the BST material.

Furthermore, it is possible that, in a further embodiment of a varactor according to the invention, electrical contact-connections 11 for making contact with the capacitor region 3 and also separate contact-connections 10 and 10' for making contact with the first PTC region 4 and second PTC region 9 respectively, are present.

A second concrete exemplary embodiment will now be described in greater detail below. This exemplary embodiment has a layer sequence such as has been described in connection with the first concrete exemplary embodiment. Furthermore, this exemplary embodiment has electrical contact-connections 10 comprising Ni at the first PTC region 4, and also electrical contact-connections 10' likewise comprising Ni at the second PTC region 9. The electrical contact-connections 10 and 10' are situated both on the front side of the varactor and on the rear side thereof. The electrical contact-connections 10 and 10' arranged on the same side are electrically conductively connected to one another, such that at both electrical contact-connections 10 and 10' the same bias voltage can be applied to the first PTC region 4 and the second PTC region 9. The resistance of the varactor was measured between the two Ni electrodes with <300 Ω.

The second concrete exemplary embodiment furthermore has two electrical contact connections 11. In this exemplary embodiment, the first electrode 2 and the second electrode 2' project toward the outside only at the side areas. The electrical contact-connections 11, comprising Ag in this case, are thus electrically conductively connected both to the first dielectric layer 1 and to the first electrode 2 and the second electrode 2'. The two electrical contact-connections 11 are respectively situated on one of the two side areas. Via the electrical contact-connections 11, it is possible to apply firstly the voltage with which the varactor is operated, and this can be AC voltage, for example, and also the bias voltage with which the first dielectric layer 1 can be tuned, and this can be DC voltage, for example. As a result of the combination of AC and DC voltage, it is possible to apply the bias voltage at the first dielectric layer 1 in this case independently of the operating voltage of the capacitor region 3.

The electrical contact-connections 10 and 10' shaped as external electrodes can be applied, for example, by the printing of Ni paste, which is subsequently fired. The electrical contact-connections 11 can likewise be applied by the printing of metal paste and subsequent annealing.

An exemplary embodiment such as has been described as second concrete exemplary embodiment was used for measurement. The measurement is carried out using an Agilent 4294A precision resistance analyzer in a frequency range of 1 to 500 kHz. The maximum dielectricity of Ba0.75Sr0.25TiO3 was attained in a temperature range of 50 to 51° C. This temperature range was attained in the first dielectric layer 1 by applying a bias voltage of between 10.5 and 8 V to the PTC regions 4 and 9. In this case, the current was less than 10 mA. The temperatures that could be attained for the dielectric layer 1 were in the range of from room temperature to above 200° C.

The results of further measurements which were carried out with this second concrete exemplary embodiment are illustrated in the following FIGS. 5 to 10.

Figure 5:
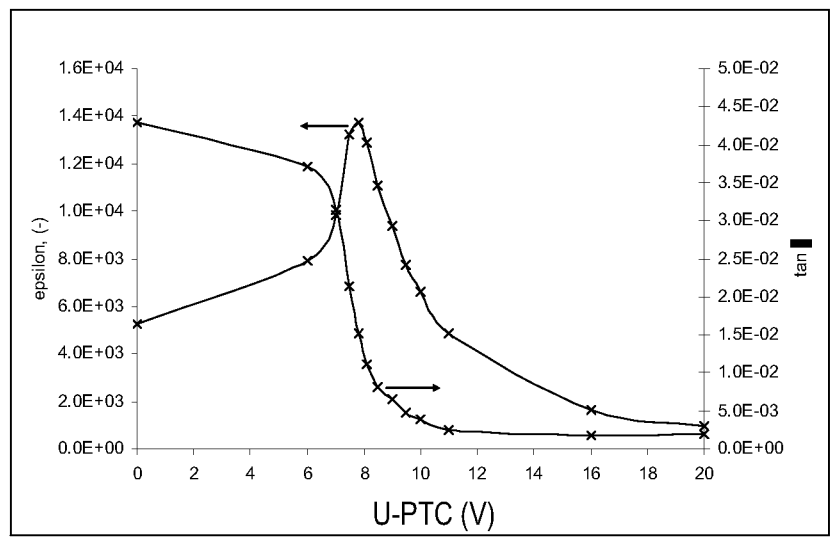
FIG. 5 shows the profile of the dielectric constant $\epsilon$ and the dielectric loss tan $\delta$ as a function of the bias voltage applied to the PTC region.

In FIG. 5, the dielectric constant $\epsilon$ and the dielectric loss tan $\delta$ are plotted in each case against the bias voltage which was applied to the PTC region (U-PTC). The two arrows in the figure indicate which of the two curves is associated with which Y-axis. In this case, the curve of the dielectric constant $\epsilon$ has a maximum in the region of approximately 8 V, after which the curve falls steeply toward higher voltages. The curve for the dielectric loss tan $\delta$ first falls slightly in the range of 0 to 6 V, and then falls very steeply in the range of between 6 and 9 V. For voltages greater than 9 V, the curve falls only slightly, and virtually no longer falls at values of greater than 12 V.

Figure 6:
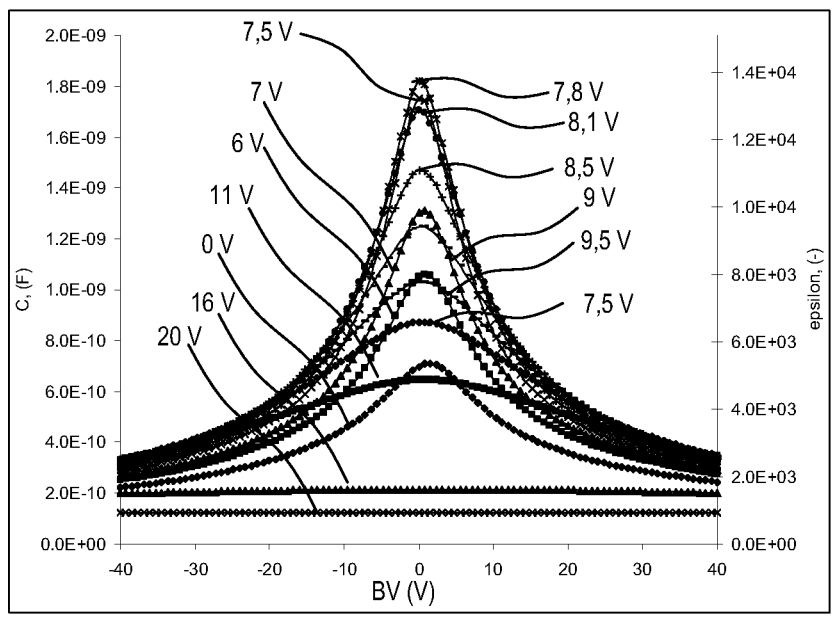
FIG. 6 shows the profile of the capacitance and of the dielectric constant $\epsilon$ plotted against the bias voltage at the first dielectric layer as a function of different bias voltages applied to the PTC region.

FIG. 6 shows the curves of the capacitance C and of the dielectric constant $\epsilon$, which are in each case plotted against the bias voltage at the first dielectric layer (BV). The measurement was carried out for different bias voltages in each case at the PTC regions (U PTC). Consequently, a curve is illustrated for each PTC region bias voltage. The respective PTC region bias voltage, varies from 0 to 20 V, is indicated in volts on the respective curve. For each of these PTC region bias voltages, the bias voltage at the first dielectric layer (BV) was ran through in a range of −40 V to 40 V. The best results were achieved for a PTC region bias voltage (U-PTC) for the values 7.8 V, 7.5 V and 8.1 V. The highest dielectric constants ϵ were measured at these PTC region bias voltages.

Figure 7:
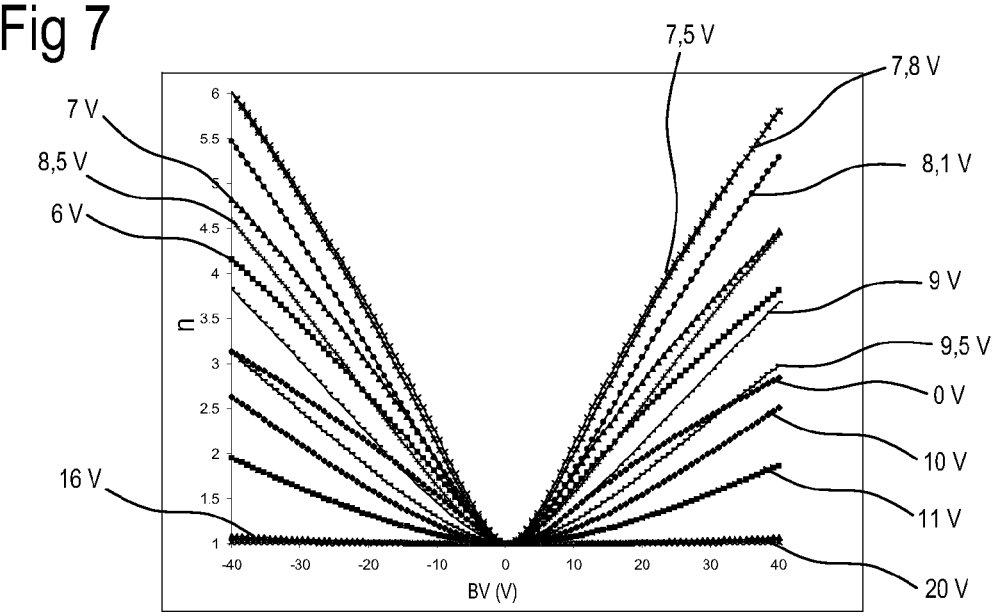
FIG. 7 shows the tunability plotted against the bias voltage at the first dielectric layer for different bias voltages at the PTC region.

FIG. 7 shows the tunability n plotted against the bias voltage applied to the first dielectric layer (BV). In this case, the tunability n was measured for different PTC region bias voltages. The different PTC region bias voltages are indicated in volts on the respective curves. In this case, the highest tunability n was achieved for a PTC region bias voltage of 7.8 V and 7.5 V. For these PTC region bias voltages, the best measurement results were also obtained in the measurement series illustrated in FIG. 6. The maximum value achieved for the tunability n is 6.02, which corresponds to a relative tunability of 83.3%. This value was achieved at a PTC region bias voltage of 7.5 V and a bias voltage at the first dielectric layer (BV) of −40 and +40 V, which corresponds to 2.75 V/µm.

Figure 8:
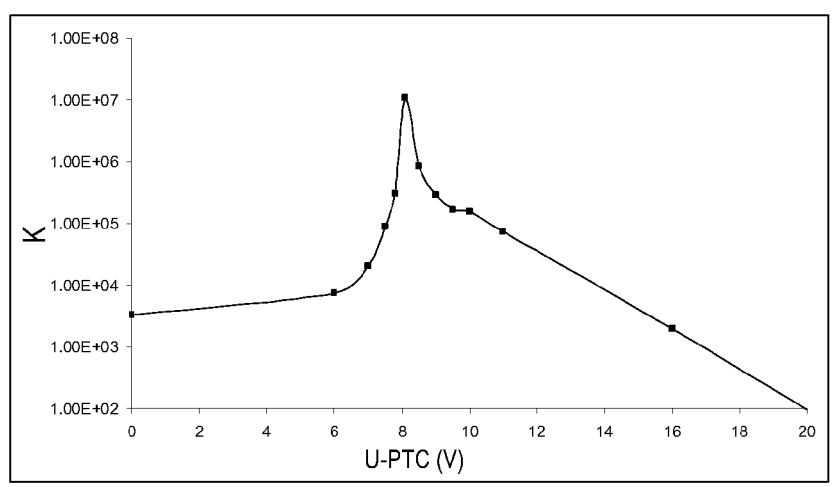
FIG. 8 shows the quality factor K plotted against the bias voltage at the PTC region.

FIG. 8 shows the quality factor K plotted against the PTC region bias voltage (U-PTC). The bias voltage at the first dielectric layer was kept constant at 40 V in this measurement. The maximum of the quality factor K was achieved for a PTC region bias voltage of 8.1 V. This is a consequence, inter alia, of the dielectric loss δ falling greatly in the range of between 6 and 8 V, as illustrated in FIG. 5.

Figure 9:
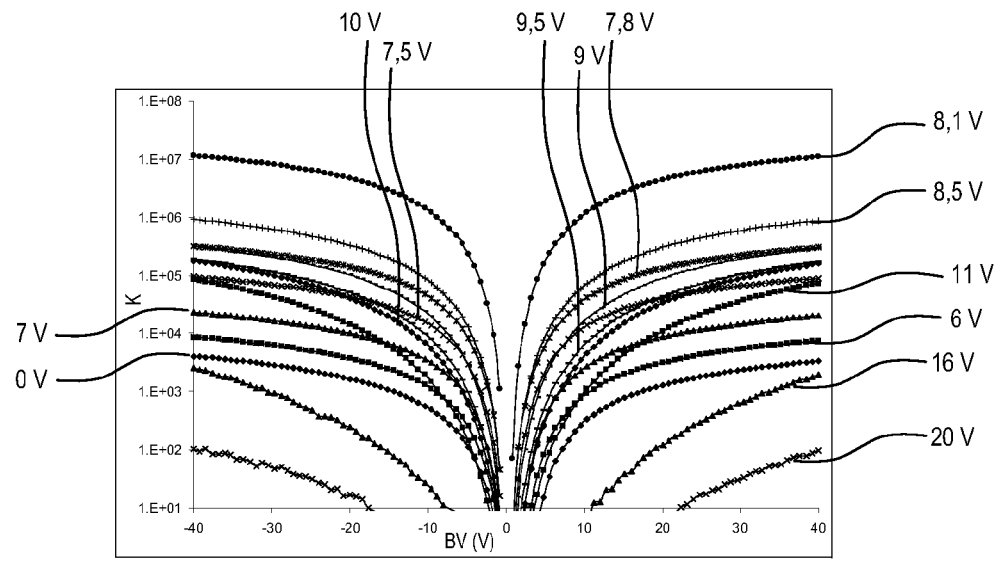
FIG. 9 shows the quality factor K plotted against the bias voltage at the first dielectric layer for different bias voltages at the PTC region.

FIG. 9 shows the quality factor K plotted against the bias voltage at the first dielectric layer (BV). The measurements were carried out for different PTC region bias voltages, which are indicated in volts on the respective curves. The highest quality factor K was obtained for a PTC region bias voltage of 8.1 V.

Figure 10:
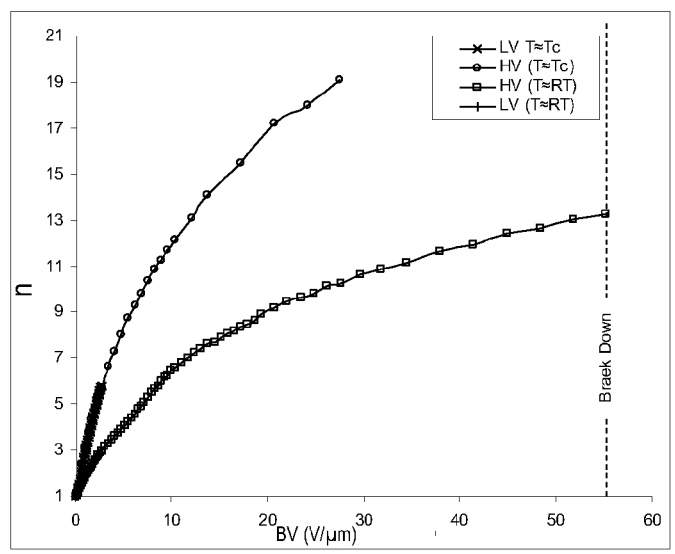
FIG. 10 shows the tunability plotted against the bias voltage for different temperatures.

In FIG. 10, the tunability n is plotted against the bias voltage at the first dielectric layer (BV). In this case, the bias voltage was increased up to breakdown. A total of four measurement series were carried out, two of them at low field (LV) and two more at high field (HV). A measurement series at room temperatures (RT) and a measurement series in the temperature range of the Curie temperature (Tc) were in each case carried out at both fields. At room temperatures and high field, the voltage could be increased up to approximately 800 V, which corresponds to approximately 55 V/µm. As a result of the application of a bias voltage to the PTC regions and the associated temperature increase from room temperature (RT) to the Curie temperature (Tc), higher tunabilities n could be obtained both in the low field (LV) and in the high field (HV). Thus, a tunability of approximately 17 could be achieved for example for a bias voltage at the first dielectric layer (BV) of 20 V/µm at Curie temperature.

The invention is not restricted by the description on the basis of the exemplary embodiments. Rather, the invention encompasses any novel feature and any combination of features, that includes, in particular, any combination of features in the patent claims, even if these features or this combination itself are/is not explicitly specified in the patent claims or exemplary embodiments.

The invention claimed is:

1. A varactor comprising:
   a first PTC region comprising a ceramic material having a positive temperature coefficient with respect to resistance; and
   a capacitor region comprising a first electrode, a second electrode, and a first dielectric layer arranged between the first electrode and the second electrode,
   wherein the first PTC region and the capacitor region are thermally conductively connected to one another, and
   wherein a capacitance of the capacitor region is alterable by application of a bias voltage to the first PTC region, to the capacitor region, or to both the first PTC region and the capacitor region.

2. The varactor according to claim 1, wherein the first PTC region is adjustable by application of a voltage to a temperature at which the first dielectric layer has a maximum tunability with regard to the dielectricity.

3. The varactor according to claim 1, wherein the first PTC region is adjustable by application of a voltage to a temperature at which dielectric loss of the capacitor region is adjustable.

4. The varactor according to claim 1, wherein the first PTC region is arranged on the first electrode.

5. The varactor according to claim 1, wherein the first PTC region comprises a dopant.

6. The varactor according to claim 5, further comprising a first intermediate layer arranged between the first PTC region and the first electrode, the first intermediate layer being largely impermeable to the dopants.

7. The varactor according to claim 6, further comprising a second dielectric layer arranged between the first intermediate layer and the first electrode.

8. The varactor according to claim 1, further comprising a second PTC region that is thermally conductively connected to the capacitor region.

9. The varactor according to claim 8, wherein the first PTC region, the second PTC region and the capacitor region form a layer stack, the first PTC region and the second PTC region being arranged at opposite sides of the capacitor region.

10. The varactor according to claim 1, wherein the first PTC region has an electrical contact-connection.

11. The varactor according to claim 1, wherein the first PTC region comprises $Ba_{1-x}Sr_xTi_{1-y}Zr_yO_3$, where $0<x<1$ and $0 \le y<1$.

12. The varactor according to claim 1, wherein the first dielectric layer comprises $Ba_{1-x}Sr_xTi_{1-y}Zr_yO_3$, where $0<x<1$ and $0 \le y<1$.

13. The varactor according to claim 1, wherein the varactor has a symmetrical construction with respect to the first dielectric layer.

14. A method for producing a varactor, the method comprising:
   forming a layer stack comprising a first PTC region, a first electrode, a first dielectric layer, and a second electrode, wherein the first PTC region is adjacent the first electrode and where the first dielectric layer is between the first electrode and second electrode; and
   sintering the layer stack thereby forming the varactor, wherein a capacitance of a capacitor region of the varactor is alterable by applying a bias voltage to the first PTC region, to the capacitor region, or to both the first PTC region and the capacitor region.

15. The method according to claim 14, wherein the first PTC region comprises dopants, the method further comprising forming a first intermediate layer between the first PTC region and the first electrode, the first intermediate layer being largely impermeable to the dopants.

16. The method according to claim 14, wherein the first PTC region and the capacitor region of the varactor are thermally conductively connected to one another.

17. A method comprising:
   forming a first PTC region comprising a ceramic material having a positive temperature coefficient with respect to resistance; and
   forming a capacitor region comprising a first electrode, a second electrode, and a first dielectric layer arranged between the first electrode and the second electrode, wherein the first PTC region and the capacitor region are thermally conductively connected to one another, and wherein the capacitance of the capacitor region is alterable by applying a bias voltage to the first PTC region, to the capacitor region, or to both the first PTC region and the capacitor region.

18. The method according to claim 17, wherein forming the first PTC region and forming the capacitor region comprise forming a layer stack comprising the first PTC region, the first electrode, the first dielectric layer and the second electrode.

19. The method according to claim 18, further comprising sintering the layer stack thereby forming a varactor.

20. The method according to claim 19, wherein the first PTC region comprises dopants, the method further comprising forming a first intermediate layer between the first PTC region and the first electrode, the first intermediate layer being largely impermeable to the dopants.

* * * * *